US011423793B2

(12) United States Patent
Håkansson

(10) Patent No.: US 11,423,793 B2
(45) Date of Patent: Aug. 23, 2022

(54) CONTROL SYSTEM AT AN AIRPORT

(71) Applicant: ADB SAFEGATE SWEDEN AB, Malmö (SE)

(72) Inventor: Ola Håkansson, Lomma (SE)

(73) Assignee: ADB SAFEGATE SWEDEN AB, Malmö (SE)

(*) Notice: Subject to any disclaimer, the term of this patent is extended or adjusted under 35 U.S.C. 154(b) by 223 days.

(21) Appl. No.: 16/690,140

(22) Filed: Nov. 21, 2019

(65) Prior Publication Data

US 2020/0090532 A1    Mar. 19, 2020

Related U.S. Application Data

(63) Continuation of application No. PCT/EP2018/063299, filed on May 22, 2018.

(30) Foreign Application Priority Data

May 23, 2017    (EP) ..................................... 17172453

(51) Int. Cl.
| | | |
|---|---|---|
| *G08G 5/06* | (2006.01) | |
| *G01S 13/91* | (2006.01) | |
| *G08G 5/00* | (2006.01) | |

(52) U.S. Cl.
CPC .............. *G08G 5/065* (2013.01); *G01S 13/91* (2013.01); *G08G 5/003* (2013.01); *G08G 5/0013* (2013.01);
(Continued)

(58) Field of Classification Search
CPC .... G08G 5/065; G08G 5/0013; G08G 5/0026; G08G 5/003; G08G 5/0082; G01S 13/91
See application file for complete search history.

(56) References Cited

U.S. PATENT DOCUMENTS 6,253,064 B1 * 6/2001 Monroe ............... G08G 5/0082
                                                   455/430
9,262,930 B2 * 2/2016 De Prins ................ G08G 5/025
(Continued)

FOREIGN PATENT DOCUMENTS

EP       1188137 B1 *  2/2007    ........... G08G 5/0043
EP       3079136 A1   10/2016
(Continued)

OTHER PUBLICATIONS

International Search Report and Written Opinion dated Aug. 10, 2018 for PCT/EP2018/063299 filed on May 22, 2018, 10 pages.
(Continued)

*Primary Examiner* — Frederick M Brushaber
*Assistant Examiner* — Elizabeth Yang
(74) *Attorney, Agent, or Firm* — Xsensus LLP

(57) ABSTRACT

This invention relates to a control system at an airport and a method implemented in such a control system. The system comprising: an input unit being arranged to communicate with an airport surveillance system at an airport, a control unit being arranged to receive, from the input unit, identification data for an aircraft on ground, position data, indicating a position of the aircraft, and, to provide the identification data to a data storage and receive an identifier of a designated gate for the aircraft from the data storage, wherein the control unit is further arranged to provide a signal to a gate control system at the designated gate for
(Continued)

preparing the designated gate to receive the aircraft if the position of the aircraft is within a predetermined distance from the designated gate.

13 Claims, 5 Drawing Sheets

(52) U.S. Cl.
CPC ......... *G08G 5/0026* (2013.01); *G08G 5/0082* (2013.01)

(56) References Cited

U.S. PATENT DOCUMENTS

| | | | |
|---|---|---|---|
| 2005/0071076 A1* | 3/2005 | Baiada | G08G 5/0043 701/120 |
| 2005/0198750 A1 | 9/2005 | Spencer et al. | |
| 2008/0109970 A1 | 5/2008 | Hutton | |
| 2012/0004837 A1* | 1/2012 | McDonald | G08G 5/0043 701/120 |
| 2016/0171899 A1* | 6/2016 | Depare | G01C 21/20 701/120 |

FOREIGN PATENT DOCUMENTS

| | | | | |
|---|---|---|---|---|
| EP | 3467734 A1 | * | 4/2019 | ............... G08G 5/00 |
| KR | 10-1555450 B1 | | 9/2015 | |

OTHER PUBLICATIONS

Notification of Communication pursuant to Article 94(3) EPC dated Aug. 8, 2018 for European application No. 17172453.7, 6 pages.
Summons to attend oral proceedings pursuant to Rule 115(1) EPC dated May 31, 2019 for European application No. 17172453.7, 5 pages.
Extended European search report dated Nov. 3, 2017 for European application No. 17172453.7, 7 pages.
International Preliminary Report on Patentability dated Oct. 10, 2019 for PCT/EP2018/063299, 22 pages.
Written Opinion dated May 28, 2019 for PCT/EP2018/063299, 6 pages.
Written Opinion dated Jul. 19, 2019 for PCT/EP2018/063299, 6 pages.

* cited by examiner

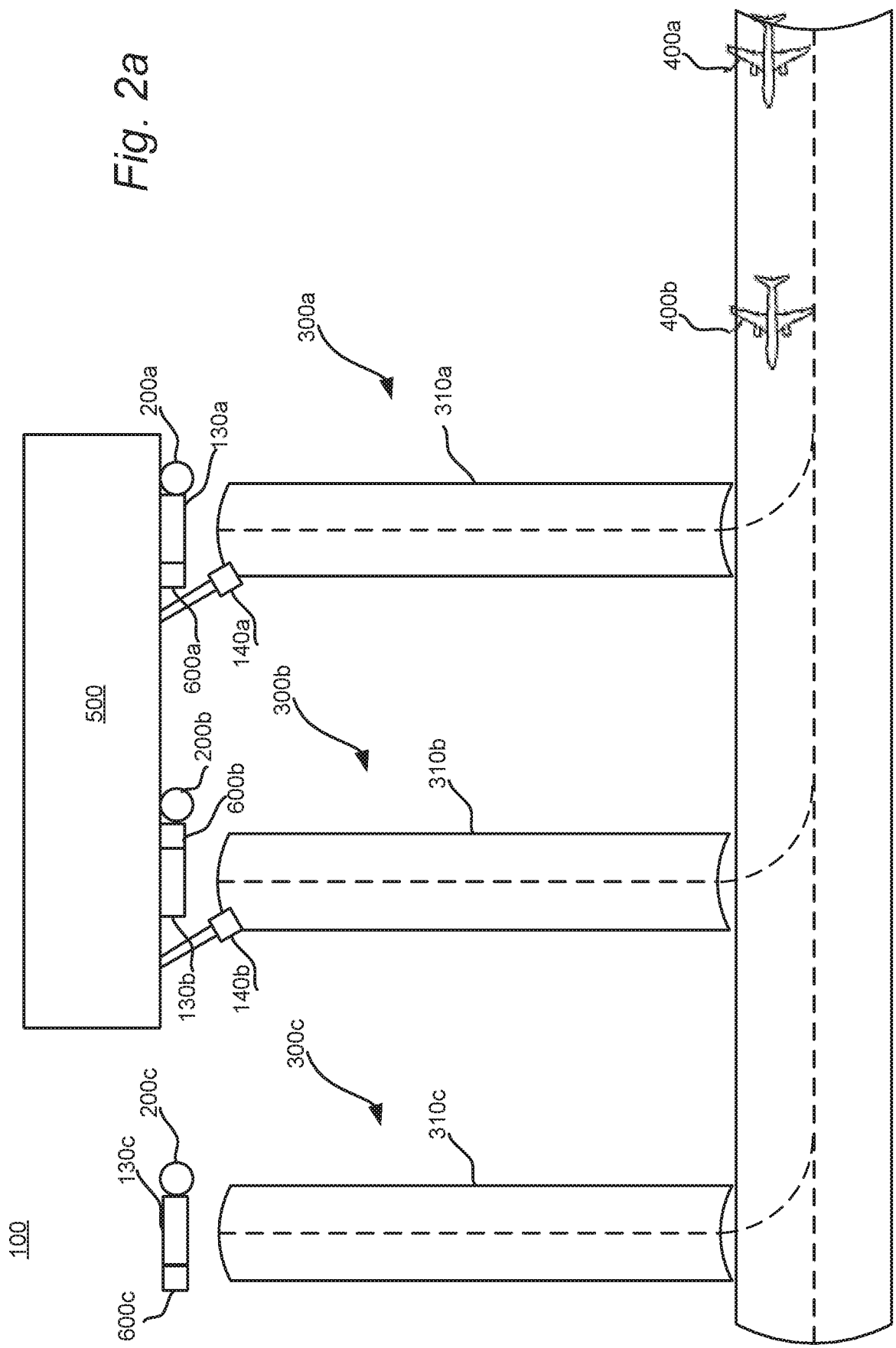

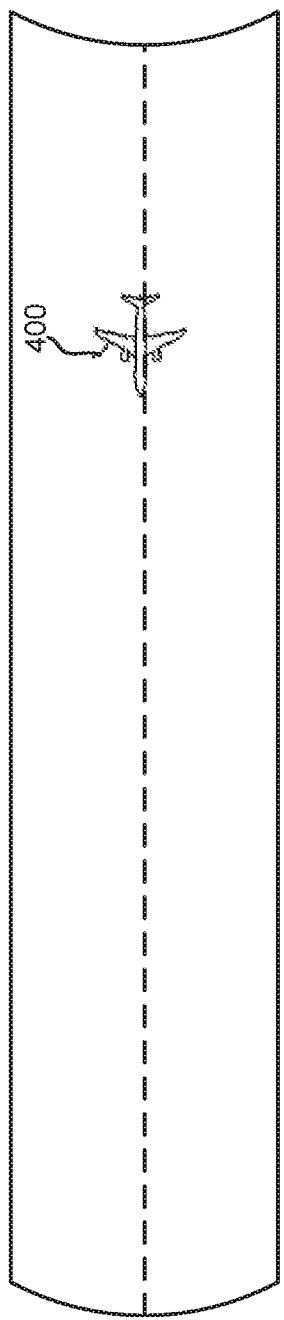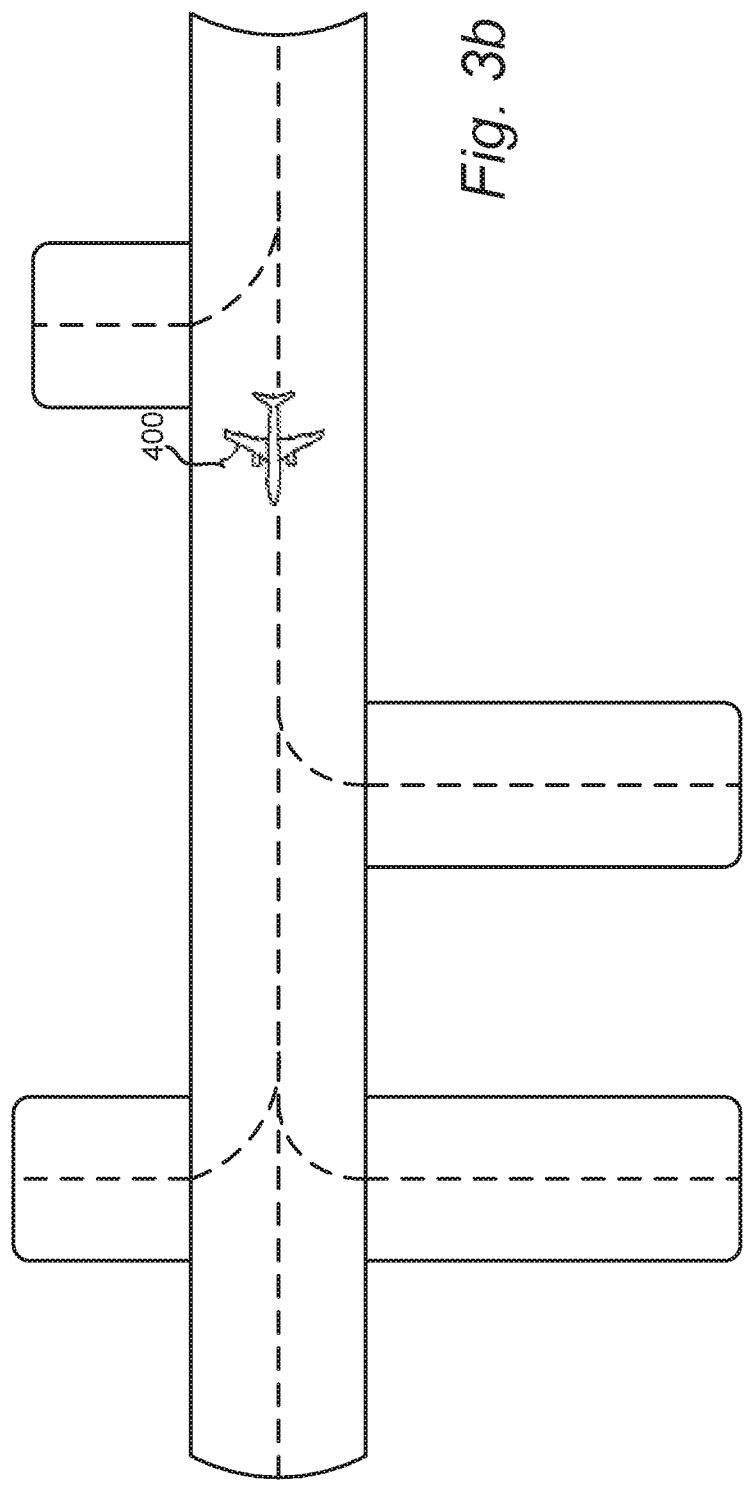

CONTROL SYSTEM AT AN AIRPORT

CROSS-REFERENCE TO RELATED APPLICATIONS

The present application is a bypass continuation of PCT filing PCT/EP2018/063299, filed May 22, 2018, which claims priority to EP 17172453.7, filed May 23, 2017, the entire contents of each are incorporated herein by reference.

TECHNICAL FIELD

The present invention generally relates to control systems at airports and methods implemented in such control systems. In particular, the invention relates to a control system at an airport adapted to receive information relating to a position of an aircraft on ground and adapt initiation of preparation of a designated gate for the aircraft in relation to the position of the aircraft.

BACKGROUND OF THE INVENTION

Before every flight, a flight plan is created and filed with the local Civil Aviation Authority. The flight plan is a document indicating the plane's planned route or flight path. It generally includes basic information such as departure and arrival points, estimated time en route, alternative airports in case of bad weather, type of flight (whether instrument flight rules or visual flight rules apply), the pilot's information, number of people on board and information about the aircraft itself.

The flight plan is static and is not adapted or amended during the flight. As an example, wind blowing from a particular direction on the runway might result in the aircraft arriving to the gate ahead of the flight plan due to shorter time on the taxiway. In order to timely dispatch and efficiently allocate and use resources it's desirable to predict the actual arrival time of an aircraft with an accuracy of about one minute. A problem with not having the desired accuracy is that resources are not allocated efficiently. In practice it results in the gate crew being idle waiting or coming too late to the gate to receive and service the aircraft.

A problem associated with the aircraft not travelling exactly in accordance with the flight plan might be that the aircraft ends up at the wrong gate since the pilot sees an active display on the way to the gate and does not realize that it is not the scheduled gate. All resources, e.g. luggage, passengers, and ground personal, that had been prepared for the aircraft are now at the wrong gate. The same goes for another aircraft i.e. the aircraft that was actually scheduled for that gate. The problem also continues into the scheduled departure of the two aircrafts. If a domestic aircraft ends up at an international gate or the other way around the problem increases even further.

SUMMARY OF THE INVENTION

In view of the above, an objective of the invention is to provide a system and a method for increasing the efficiency and safety preparing for and during a docking procedure of an aircraft.

In particular, an objective is to provide a control system at an airport.

According to a first aspect, the present invention is realized by a control system at an airport comprising: an input unit being arranged to communicate with an airport surveillance system at an airport, a control unit being arranged to receive, from the input unit, identification data for an aircraft on ground, position data, indicating a position of the aircraft, and, to provide the identification data to a data storage and receive an identifier of a designated gate for the aircraft from the data storage, wherein the control unit is further arranged to calculate a delay time based on the position of the aircraft and an estimated travel time from the position of the aircraft to the designated gate, wherein the control unit is further arranged to, after the delay time, provide a signal to a gate control system at the designated gate for preparing the designated gate to receive the aircraft if the position of the aircraft is within a predetermined distance from the designated gate.

The aircraft on ground may be an aircraft on a runway after having just landed thereon, or an aircraft on a taxiway having just transferred from a runway to the taxiway. In other words, the aircraft may be located on a runway after having just landed thereon, or located on a taxiway having just transferred from a runway to the taxiway. Thus, the aircraft may be distant to the gate potentially beyond visual reach of ground personnel and beyond reach of local sensor equipment that may be available at the gate.

In the prior art, the preparation of the gate is related to the flight plan. According to claim 1, the gate is prepared in response to a signal from the control unit depending on if the aircraft is within the predetermined distance from the designated gate. An advantage with this is that the preparation of the gate can be adapted to changes in arrival time of the aircraft, also changes that are not accounted for in the flight plan. This would increase the efficiency and safety at the airport.

As disclosed hereinabove, the control system may further comprise that the control unit is adapted to delay the signal to the gate control system based on the position of the aircraft and an estimated travel time from the position of the aircraft to the designated gate. The signal to the gate control system may be delayed a certain amount of time. This means that the signal is not necessarily sent at the moment in time when the aircraft touches the runway. At some airports this might be too early since it takes a long time for the aircraft to reach the gate. Hence, it is a major advantage to be able to delay the preparation of the gate. Preferably, the gate should be prepared as late as possible, in other words, just in time. In this way, the designated gate is active, e.g. displays are lit, when the aircraft is approaching. This reduces the problem of a pilot steering the aircraft to the wrong gate.

An advantage with this embodiment is that the preparation of the gate can be adapted to the estimated travel time for the aircraft. The travel time may, e.g. depend on weather conditions such as wind, the design of the airport, other vehicles, the aircraft's performance.

The estimated travel time may be calculated based on an expected taxi time of the aircraft. The taxi time may be defined as the total time of transporting the aircraft from the runway to the gate and may encompass also the time spent on the runway, i.e. the time from when the aircraft touches ground to when the aircraft enters a connecting taxiway. The estimated travel time may be calculated based on one or more from the list of: airport size, airport design, weather conditions, performance of the aircraft, how often the aircraft needs to restart, queue on the taxiway.

Alternatively, or additionally, the estimated travel time may be calculated based on traffic pattern.

In some embodiments, the control system at an airport may be realized as comprising: an input unit being arranged to communicate with an airport surveillance system at an airport, a control unit being arranged to receive, from the input unit, identification data for an aircraft, position data, indicating a position of the aircraft, and, to provide the identification data to a data storage and receive an identifier of a designated gate for the aircraft from the data storage, wherein the control unit is further arranged to provide a signal to a gate control system at the designated gate for preparing the designated gate to receive the aircraft if the position of the aircraft is within a predetermined distance from the designated gate.

In these embodiments, the control unit may be arranged to provide a signal to a gate control system at the designated gate before the aircraft touches ground. In other words, the control unit may be arranged to provide a signal to a gate control system at the designated gate while the aircraft is in the air. This can be advantageous for small airports with short travel distance between runway and gate.

The control system may further be arranged to receive a flight plan from an airport database system, wherein the control unit is arranged to determine an estimated time of arrival of the aircraft at the designated gate, and wherein the control unit is arranged to update the received flight plan with the estimated time of arrival.

An advantage with this embodiment is that the estimated time of arrival in the flight plan for the aircraft will be closer to the actual time of arrival of the aircraft.

The control unit may be adapted to provide the signal to the gate control system when the position of the aircraft is within a predetermined distance from the designated gate.

An advantage with this embodiment is that the signal is sent to the gate control when the aircraft is detected within a geofence. This accounts for a cost efficient solution.

The predetermined distance may be between the designated gate and a subarea of a runway at the airport. Preferably, the subarea of the runway has a length of less than 200 m.

An advantage with this embodiment is that it provides substantial time for preparing the gate.

The predetermined distance may be between the designated gate and a subarea of a taxiway at the airport. Preferably, the subarea of the taxiway has a length of less than 100 m.

An advantage with this embodiment is that the estimated time of arrival can be determined with greater accuracy while there is at the same time enough time to prepare the gate.

The predetermined distance may be between the designated gate and an area enclosing the designated gate. Preferably, the area enclosing the designated gate has a length of less than 20 m.

An advantage with this embodiment is that the estimated time of arrival can be determined with even greater accuracy.

The airport surveillance system may include at least one of ADS-B, multilateration, primary surveillance radar and secondary surveillance radar.

An advantage with this embodiment is that information about the position of the aircraft can be collected with great accuracy. Furthermore, factors at the airport influencing the estimated time of arrival of the aircraft can be determined more easily and hence, the estimated time of arrival will be closer to the actual time of arrival.

The preparing of the designated gate may comprise the gate control system being arranged to activate a visual docking guidance system.

An advantage with this embodiment is that visual docking guidance system is not started too early, which might misguide other aircraft. Additionally, starting the visual docking guidance system as late as possible is also an energy-saving measure.

The visual docking guidance system may be a laser docking system. The laser docking system may be arranged to scan an apron of the designated gate for obstacles. The laser docking system may be arranged to scan the apron of the designated gate for obstacles when the position of the aircraft is within the subarea of the taxiway.

According to a second aspect of the invention, the present invention is realized by a method implemented in a control system at an airport, the method comprising: receiving, from an airport surveillance system at an airport, identification data for an aircraft on ground and position data, indicating a position of the aircraft, providing the identification data to a data storage and receiving an identifier of a designated gate for the aircraft, calculating a delay time based on the position of the aircraft and an estimated travel time from the position of the aircraft to the designated gate, after the delay time providing a signal to the designated gate for preparing the designated gate to receive the aircraft if the position of the aircraft, received from the airport surveillance system, is within a predetermined distance from the designated gate.

As disclosed hereinabove, the method may further comprise delaying the signal to the gate control system based on the position of the aircraft and an estimated travel time from the position of the aircraft to the designated gate. The signal may be delayed a certain amount of time.

The estimated travel time may be calculated based on an expected taxi time of the aircraft. The estimated travel time may be calculated based on one or more from the list of: airport size, airport design, weather conditions, performance of the aircraft, how often the aircraft needs to restart, queue on the taxiway.

Alternatively, or additionally, the estimated travel time may be calculated based on traffic pattern.

The method may further comprise receiving a flight plan from an airport database system, determining an estimated time of arrival of the aircraft at the designated gate, and updating the received flight plan with the estimated time of arrival.

The method may further comprise providing the signal to the gate control system when the position of the aircraft is within a predetermined distance from the designated gate.

The preparing of the designated gate may comprise activating a visual docking guidance system.

The advantages of the first aspect are equally applicable to the second aspect.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIGS. 2a-b illustrate an embodiment of the control system at an airport.

FIGS. 3a-b illustrate different positions in which the aircraft can be when the control unit provides a signal to a gate control system at the designated gate for preparing the designated gate.

DETAILED DESCRIPTION OF PREFERRED EMBODIMENTS

The present invention enables adaption of preparation of gates at an airport. Furthermore, the situation where a pilot is driving to the wrong gate may be avoided. Additionally, resources at the airport may be used more efficiently and the safety at the airport may be increased.

Figure 1:
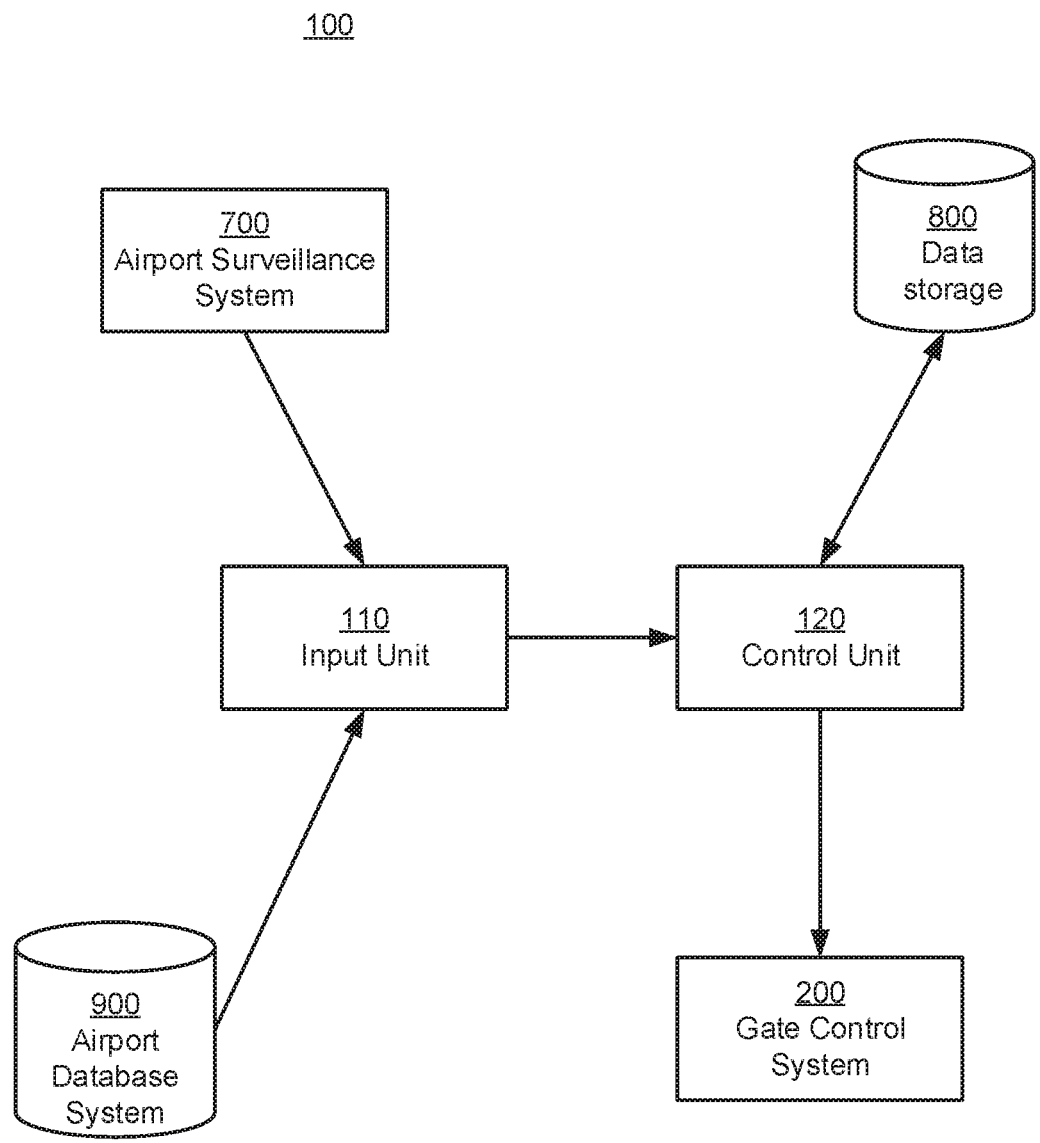
FIG. 1 illustrates an embodiment of the inventive control system at an airport.

In the following, embodiments of the control system at an airport will be described. FIG. 1 illustrates an embodiment of the inventive control system at an airport.

The system 100 comprises an input unit 110, which is in communication with an airport surveillance system 700 at an airport, and a control unit 120.

The input unit may be a receiver or be realized as a plurality of receivers. The control unit 120 may be realized as a plurality of computer processing units that together form the control unit, i.e. a plurality of computers may be interconnected in order to form the control unit and its functionality as disclosed herein. The function of the control unit may be shared between a plurality of units at the airport.

The airport surveillance system 700 collects information such as, e.g. identification data for an aircraft on ground and position data, indicating a position of the aircraft. The airport surveillance system includes at least one of ADS-B, multilateration, primary surveillance radar, and secondary surveillance radar. The airport surveillance system can be run by the airport or by another party. The airport surveillance system may comprise one sensor or a plurality of sensors for ADS-B, multilateration, primary surveillance radar, and/or secondary surveillance radar. There may e.g. be a local surveillance system at substantially every gate. The local surveillance system can include at least one of a local sensor for ADS-B multilateration, primary surveillance radar, and secondary surveillance radar.

Alternatively, the airport surveillance system is shared at the airport. In this embodiment, the airport surveillance system comprises a plurality of sensors distributed on the airport. The sensors can be for at least one of ADS-B multilateration, primary surveillance radar, and secondary surveillance radar.

It is to be noted that the airport surveillance system 700 can be arranged to collect information about the aircraft also before the aircraft touches ground.

The identification data and position data are sent to the input unit 110 from the airport surveillance system 700 or retrieved by the input unit 110 from the airport surveillance system 700.

The control unit 120 receives, from the input unit 110, identification data for an aircraft on ground, and position data, indicating a position of the aircraft. The identification data may e.g. be a flight number, ICAO designator for the aircraft operating agency followed by a flight number, registration marking of the aircraft (commonly the identification number in an alphanumeric format) and/or, call sign determined by military authorities. The control unit 120 provides the identification data for the aircraft to a data storage 800 and receives an identifier of a designated gate for the aircraft from the data storage 800. The data storage may e.g. be an Apron Management System, a SCADA-system (Supervisory Control and Data Acquisition system), an AODB (Airport Operational Data Base) or a web server. The identifier of the designated gate may e.g. be a gate number.

The control unit 120 provides a signal to a gate control system 200 at the designated gate for preparing the designated gate to receive the aircraft if the position of the aircraft is within a predetermined distance from the designated gate.

The predetermined distance is preferably chosen so that the gate is prepared as late as possible, e.g. just in time before the aircraft is approaching the gate. This may reduce the problem of a pilot steering an aircraft to this designated gate even if it is not that aircraft's designated gate.

The act of preparing of the designated gate can comprise the gate control system being arranged to activate a visual docking guidance system. The act of preparing may also, or alternatively, comprise preparing resources, e.g. luggage, trucks, passengers, and ground personnel.

The visual docking guidance system may include a display displaying, e.g., flight number, type and version of the aircraft, distance from the aircraft to a stopping position at the gate, amount of deviation of the aircraft from the centerline of the gate. The visual docking guidance system may also, or alternatively, include a laser identification system enabling a further identification of the airplane.

In some embodiments, the preparation of the gate is divided into several steps. As an example, immediately after the gate control system receives a signal for preparing the gate, some preparations are made but not all. As an example, recourses are prepared such as ground personnel and trucks. After a certain amount of time has passed, passengers waiting for the aircraft are prepared. The last step of preparation may be activating the visual docking system.

The gate control system can be arranged to activate the display when the position of the aircraft is within the area enclosing the designated gate, i.e. the gate area.

Figure 2B:
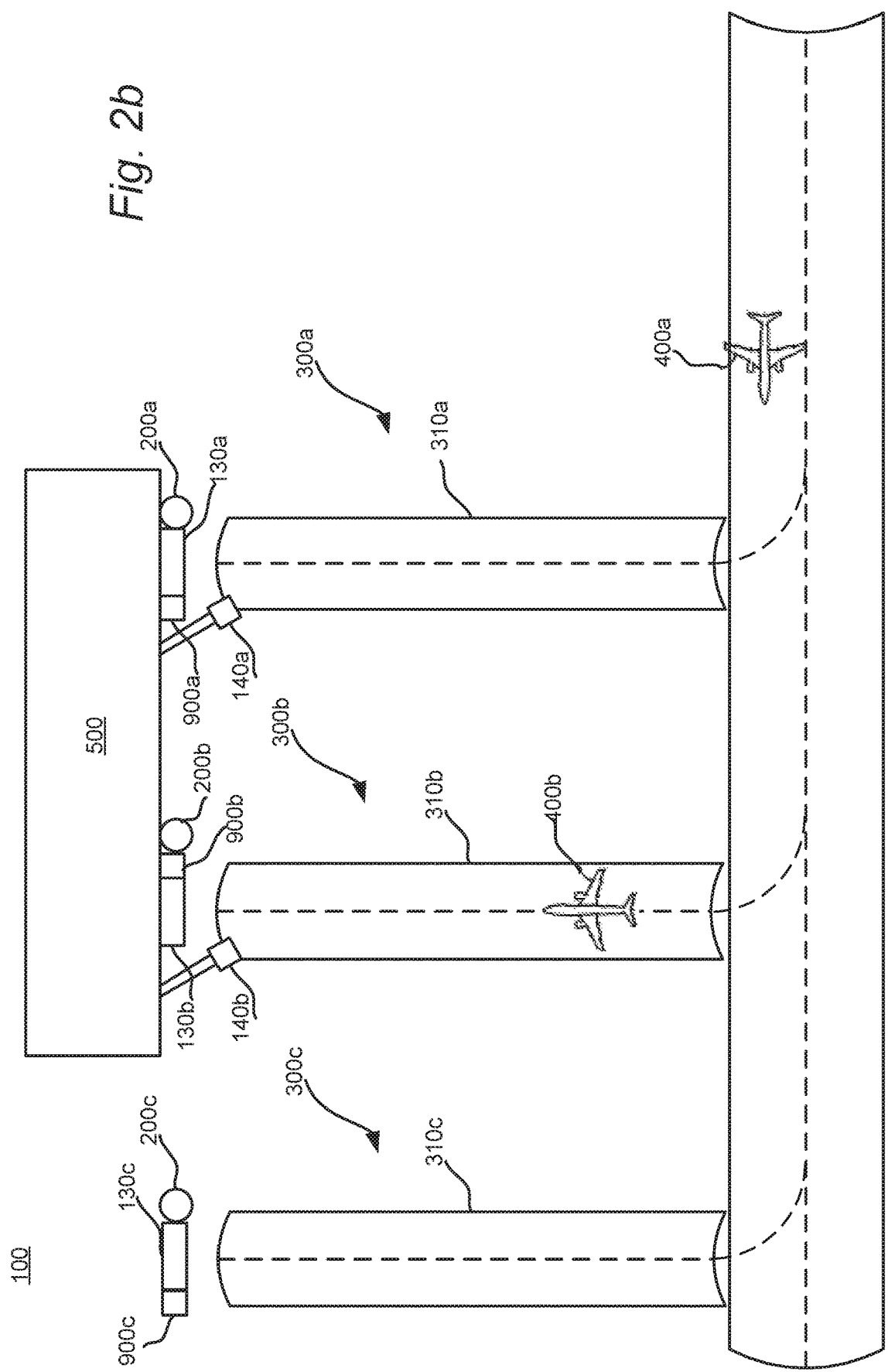

FIGS. 2a-b illustrate an embodiment of the control system at an airport. FIG. 2a-b also illustrates a terminal building 500, aircraft 400a-b that are about to dock, gates 300a-c, and gate areas 310 a-c. Each gate 300a, b may comprise a bridge 140a, b for docking the aircraft to the terminal building 500. The system 100 further comprises gate control systems 200a-c arranged at the gates and, displays, or visual docking guidance systems, 130a-c. The system 100 also includes laser identification systems 600a-c.

As described before, the preparation of the gate is initiated in response to the control unit 120 sending a signal to the gate control system of the designated gate. An advantage with that will be illustrated by the following example.

In FIG. 2a, an aircraft 400b is heading for its designated gate 300b. Not shown is an aircraft 400a which is heading for its designated gate 300a. Aircraft 400a is still at the taxiway. Gate 300b has been prepared for aircraft 400b. In one embodiment, the display 130b is activated just before the aircraft 400b enters the gate area 310b. Alternatively, the display 130b is activated at the same time as the aircraft 400b enters the gate area 310b. Activating the display 130b may include indicating on the display that the gate is prepared to receive a particular flight or aircraft. Activating the display may include lighting the display. A display that is not activated indicates that the gate is not prepared to receive any flights and/or aircraft.

In FIG. 2a has gate 300a not yet been prepared for aircraft 400a. This is advantageous since the pilot of aircraft 400b is then not confused by, e.g. display 130a being lit. This reduces the risk of the pilot of aircraft 400b steering aircraft 400b to gate 300a.

FIG. 2b illustrates aircraft 400b docking to its designated gate 300b. Aircraft 400a is heading for its designated gate 300a. Gate 300a is prepared and in one embodiment the display 130a is lit. In another embodiment, the display 130a is lit when aircraft 400a enters the gate area 310a.

In one embodiment, the control unit is adapted to provide the signal to the gate control system when the position of the aircraft is within a predetermined distance from the designated gate. The predetermined distance might be between the designated gate and a subarea of a runway at the airport. As an example, the accuracy of determining the position of the aircraft on the runway, in order to determine the predetermined distance, is preferably 200 m.

The predetermined distance may be between the designated gate and a subarea of a taxiway at the airport. As an example, the accuracy of determining the position of the aircraft at the taxiway, in order to determine the predetermined distance, is preferably 100 m.

The predetermined distance may be between the designated gate and an area enclosing the designated gate. As an example, the accuracy of determining the position of the aircraft at the taxiway, in order to determine the predetermined distance, is preferably 20 m.

FIG. 3a illustrates an embodiment in which the control unit provides a signal to a gate control system at the designated gate for preparing the designated gate immediately when the aircraft touches the ground of the airport. This is advantageous for very small airports since the aircraft has a short path to travel to the gate. At some airports, the control unit provides a signal to a gate control system at the designated gate for preparing the designated gate before the aircraft touches the ground of the airport.

FIG. 3b illustrates an embodiment in which the control unit provides a signal to a gate control system at the designated gate for preparing the designated gate when the aircraft is on the taxiway.

In a further embodiment, the control unit is adapted to delay the signal to the gate control system based on the position of the aircraft and an estimated travel time from the position of the aircraft to the designated gate. Thus, it is understood that the control unit is further arranged to calculate a delay time based on the position of the aircraft and an estimated travel time from the position of the aircraft to the designated gate. The estimated travel time for the aircraft can be calculated based on expected taxi time. Furthermore, the estimated travel time for the aircraft can be calculated by taking at least one of the following parameters into account: airport size, airport design, weather conditions, performance of the aircraft, how often the aircraft needs to restart, cue on the taxiway. In one embodiment, the signal is delayed a certain amount of time such that the gate can be prepared just in time for the aircraft arriving at the gate area. By way of example, it may be statistically known that the average travel time from the runway to the gate at a specific airport is e.g. 5 minutes during certain weather conditions. The control unit may then introduce a 4-minute delay in the signal to the control system in order to provide a just-in-time preparation of the gate.

In one embodiment, the control system 100, more particularly the input unit 110, is arranged to receive a flight plan from the airport database system 900. The control unit is arranged to determine an estimated time of arrival of the aircraft at the designated gate, as described earlier. The control unit 120 is arranged to update the received flight plan with the estimated time of arrival. The updated flight plan can be used e.g. for updating the arrival time at displays in the terminal building to inform people. It can also be used for planning preparation of the gate.

Figure 4:
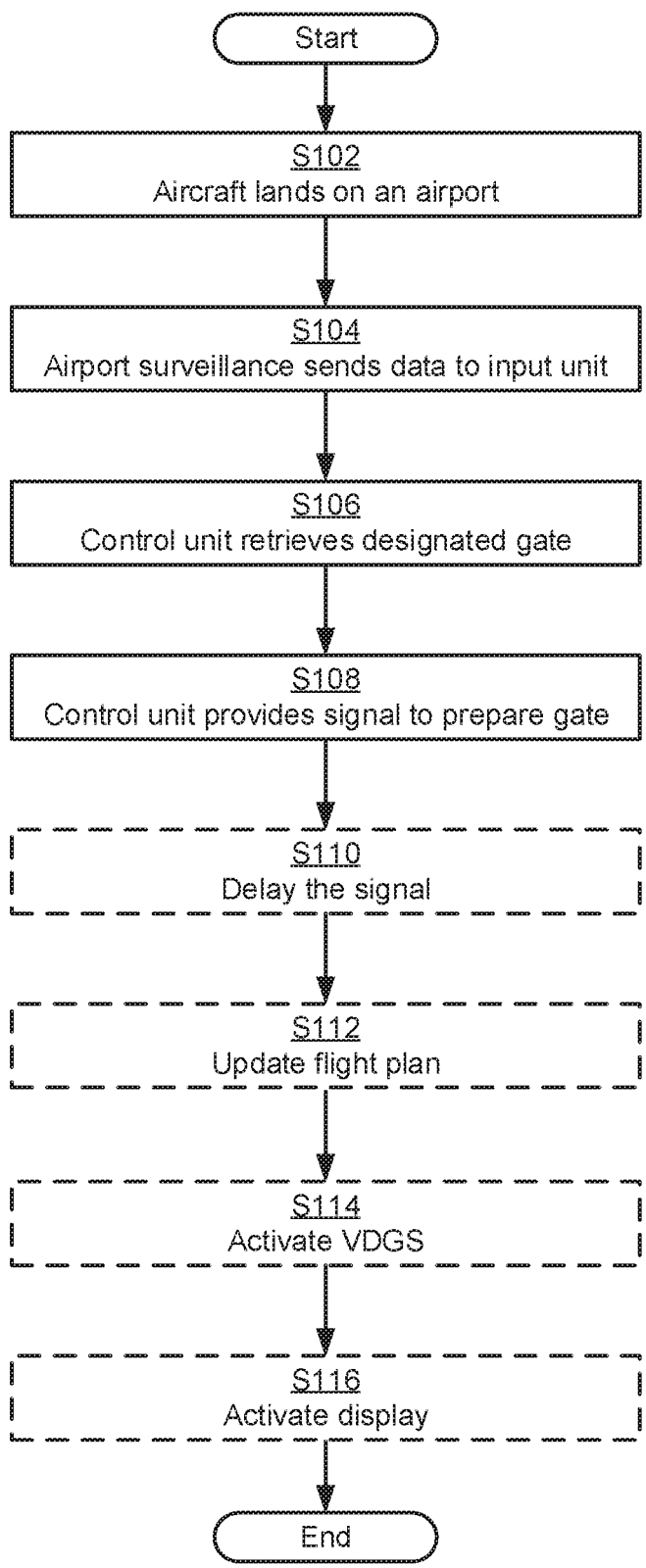
FIG. 4 illustrates an embodiment of the inventive method implemented in a control system at an airport.

FIG. 4 illustrates an example of the inventive method and system. In step S102, an aircraft lands on an airport. Step S104, the airport surveillance system of the airport sends identification data of the aircraft and position data, indicating a position of the aircraft, to the input unit of the control system. In one embodiment the data is sent also before the aircraft touches ground.

In step S106, the control unit retrieves information from a data storage about which gate is the designated gate for the aircraft, using the identification data of the aircraft.

In step S108, if and/or when certain conditions are fulfilled, the control unit provides a signal to a gate control system at the designated gate for preparing the designated gate to receive the aircraft.

The conditions to be fulfilled may be stored in the data storage mentioned above. Alternatively, the conditions may be stored in a separate data storage, a conditions data storage.

A condition to be fulfilled may e.g. be that the position of the aircraft is within a predetermined distance from the designated gate.

Another condition to be fulfilled may e.g. be when the position of the aircraft is within a predetermined distance from the designated gate.

In an optional step S110, the control unit delays the signal to the gate control system based on the position of the aircraft and an estimated travel time from the position of the aircraft to the designated gate. Estimated travel times for the airport may be stored in any of the data storages previously mentioned. The data storage may include estimated travel times between the gates of the airport and different positions on the airport.

In an optional step S112, the control unit determines an estimated time of arrival of the aircraft at the designated gate and updates the flight plan of the aircraft with the estimated time of arrival.

In an optional step S114, the gate control system activates a visual docking guidance system (VDGS). In an optional step S116, the gate control system activates a display of the visual docking guidance system. In an embodiment, step s116 is performed when the position of the aircraft is within the area enclosing the designated gate.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A control system comprising:
   an input configured to communicate with an airport surveillance system,
   processing circuitry configured to receive, from the input, identification data for an aircraft on ground, position data, indicating a position of the aircraft on the ground, and, to send the identification data to a data storage device and receive an identifier of a designated gate for the aircraft from the data storage device, wherein the processing circuitry is further configured to send a signal to a gate control system at the designated gate in preparation of the designated gate receiving the aircraft in response to the position of the aircraft being within a predetermined distance from the designated gate, and the processing circuitry is further configured to delay sending of the signal to the gate control system by a certain amount of time based on an estimated travel time of the aircraft from the position of the aircraft to the designated gate, wherein in response to the signal being sent from the processing circuitry to the gate control system to prepare the designated gate, the signal triggers the gate control system to activate a visual docking guidance system.

2. The control system according to claim 1, wherein the estimated travel time is calculated based on an expected taxi time of the aircraft.

3. The control system according to claim 2, wherein the estimated travel time is calculated based on at least one of an airport size, an airport design, a weather condition, a performance of the aircraft, how often the aircraft needs to restart, or a queue on the taxiway.

4. The control system according to claim 1, wherein the processing circuitry is configured to receive a flight plan from an airport database system, wherein the processing circuitry is configured to determine an estimated time of arrival of the aircraft at the designated gate, and the processing circuitry is further configured to update the received flight plan with the estimated time of arrival.

5. The control system according to claim 1, wherein the airport surveillance system includes at least one of ADS-B, multilateration, primary surveillance radar, or a secondary surveillance radar.

6. The control system according to claim 1, wherein the visual docking guidance system comprises a display and the gate control system is configured to activate the display when the position of the aircraft is within an area enclosing the designated gate.

7. The control system according to claim 1, wherein the visual docking guidance system facilitates docking of the aircraft to the designated gate.

8. The control system according to claim 1, wherein the visual docking guidance system operates a laser to scan an apron of the designated gate for obstacles.

9. A method implemented in a control system, the method comprising:

receiving, from an airport surveillance system, identification data for an aircraft on ground and position data, indicating a position of the aircraft on the ground;

sending the identification data to a data storage device and receiving an identifier of a designated gate for the aircraft;

sending a signal to the designated gate for preparing the designated gate to receive the aircraft in response to the position of the aircraft being within a predetermined distance from the designated gate; and delaying sending of the signal to the designated gate a certain amount of time based on an estimated travel time of the aircraft from the position of the aircraft to the designated gate, wherein the preparing the designated gate comprises activating a visual docking guidance system.

10. The method according to claim 9, further comprising:

calculating the estimated travel time based on at least one of an airport size, an airport design, a weather condition, a performance of the aircraft, how often the aircraft needs to restart, a queue on the taxiway, or an expected taxi time of the aircraft.

11. The method according to claim 9, further comprising:

receiving a flight plan from an airport database system;

determining an estimated time of arrival of the aircraft at the designated gate; and updating the received flight plan with the estimated time of arrival.

12. The method according to claim 9, wherein the visual docking guidance system facilitates docking of the aircraft to the designated gate.

13. The method according to claim 9, wherein the visual docking guidance system operates a laser to scan an apron of the designated gate for obstacles.

* * * * *